US011934841B2

(12) United States Patent
Brown et al.

(10) Patent No.: US 11,934,841 B2
(45) Date of Patent: Mar. 19, 2024

(54) SYSTEM AND METHOD FOR MANAGING A POWER SUPPLY MANAGEMENT NAMESPACE DURING A CHASSIS BOOT UP

(71) Applicant: Dell Products L.P., Round Rock, TX (US)

(72) Inventors: Michael Emery Brown, Austin, TX (US); Jitendra Gul Jagasia, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 388 days.

(21) Appl. No.: 17/386,473

(22) Filed: Jul. 27, 2021

(65) Prior Publication Data

US 2023/0031359 A1    Feb. 2, 2023

(51) Int. Cl.
*G06F 9/44* (2018.01)
*G06F 1/12* (2006.01)
*G06F 1/14* (2006.01)
*G06F 1/26* (2006.01)
*G06F 1/28* (2006.01)
*G06F 9/4401* (2018.01)

(52) U.S. Cl.
CPC .............. *G06F 9/4403* (2013.01); *G06F 1/12* (2013.01); *G06F 1/14* (2013.01); *G06F 1/263* (2013.01); *G06F 1/28* (2013.01)

(58) Field of Classification Search
CPC ....................................................... G06F 9/44
See application file for complete search history.

(56) References Cited

U.S. PATENT DOCUMENTS

| | | | | |
|---|---|---|---|---|
| 11,061,585 | B1* | 7/2021 | Xu | G06F 12/0868 |
| 2008/0104303 | A1* | 5/2008 | Jeansonne | G06F 13/24 |
| | | | | 710/48 |
| 2010/0058045 | A1* | 3/2010 | Borras | G06F 9/4401 |
| | | | | 711/E12.008 |
| 2013/0290470 | A1* | 10/2013 | CaraDonna | G06F 16/211 |
| | | | | 709/214 |
| 2016/0086300 | A1* | 3/2016 | Ryu | G06T 1/20 |
| | | | | 345/520 |
| 2017/0064650 | A1* | 3/2017 | Sugumar | H04W 52/028 |
| 2017/0308139 | A1* | 10/2017 | Shih | G06F 1/28 |
| 2018/0059982 | A1* | 3/2018 | Balakrishnan | G06F 3/0632 |
| 2020/0183677 | A1* | 6/2020 | Hong | G06F 8/66 |
| 2020/0225817 | A1* | 7/2020 | Coffman | G06F 3/0488 |
| 2021/0081012 | A1* | 3/2021 | Suryanarayana | G06F 9/4406 |
| 2022/0334847 | A1* | 10/2022 | Dai | G06F 9/4881 |

* cited by examiner

*Primary Examiner* — Phil K Nguyen
(74) *Attorney, Agent, or Firm* — Chamberlain, Hrdlicka, White, Williams & Aughtry; Aly Z. Dossa

(57) ABSTRACT

A method for managing a chassis includes obtaining, by an enclosure controller of the chassis, a power supply application to the chassis using a power supply interface, wherein the power supply interface is operatively connected to a plurality of power supplies, initiating a boot-up of a kernel of the chassis in response to the power supply application, initiating a parallel boot task using the power supply management temporary namespace to identify a power supply of the plurality of power supplies, initiating a mounting of a boot-up file system, and initiating a user space boot-up using the boot-up file system, wherein the user space boot-up and the parallel boot task are initiated in parallel.

17 Claims, 7 Drawing Sheets

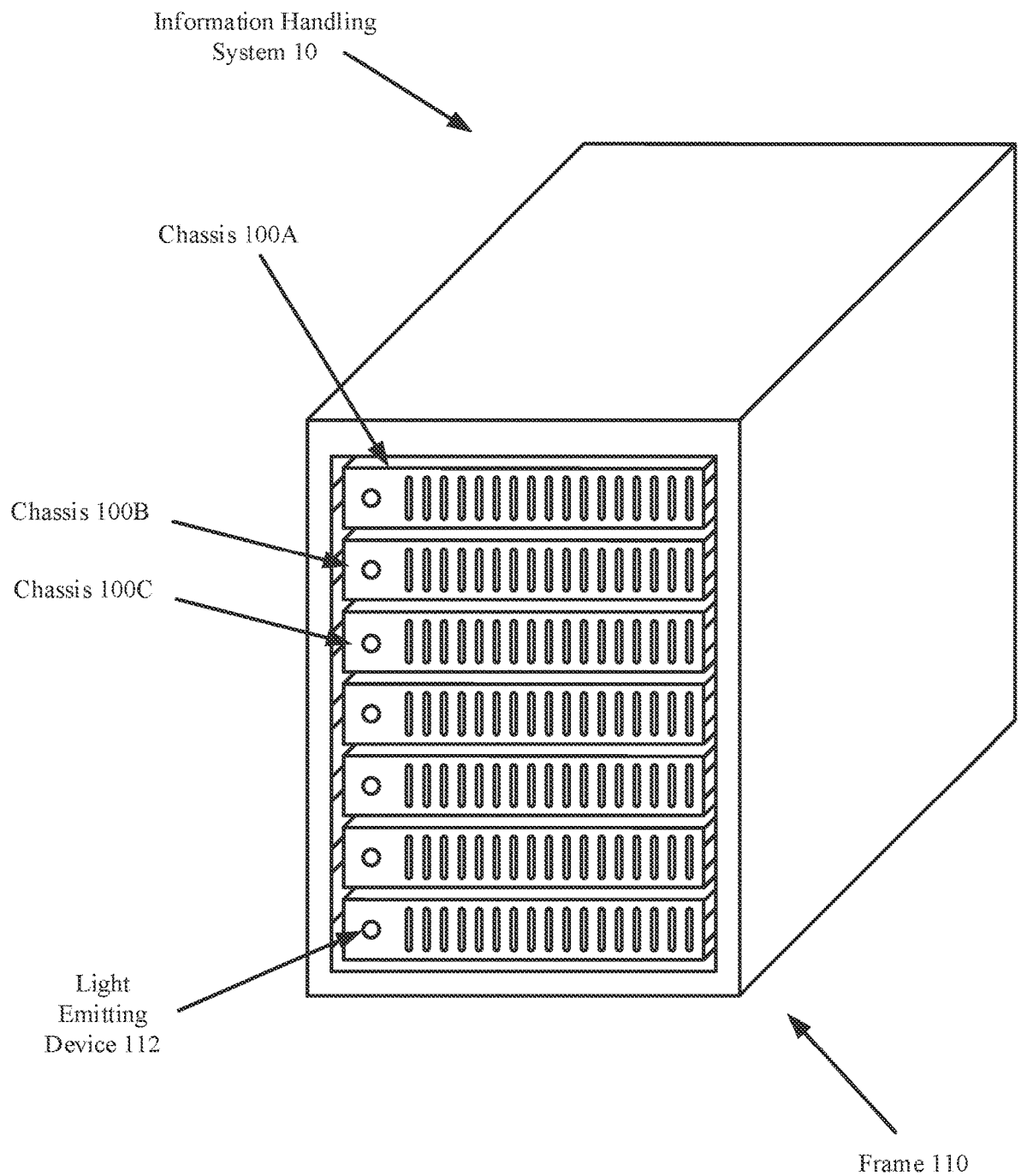
FIG. 1.1

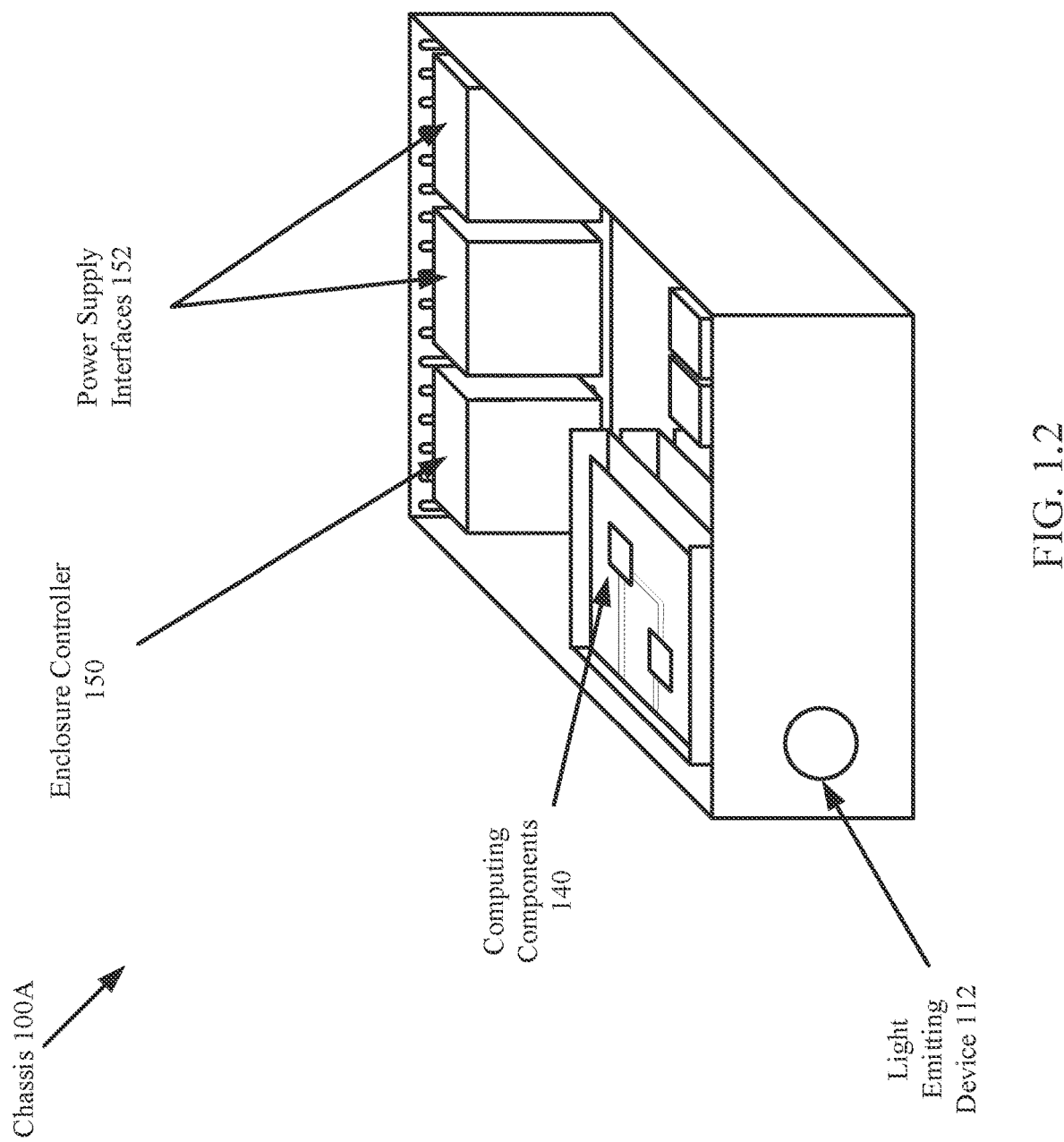
FIG. 1.2

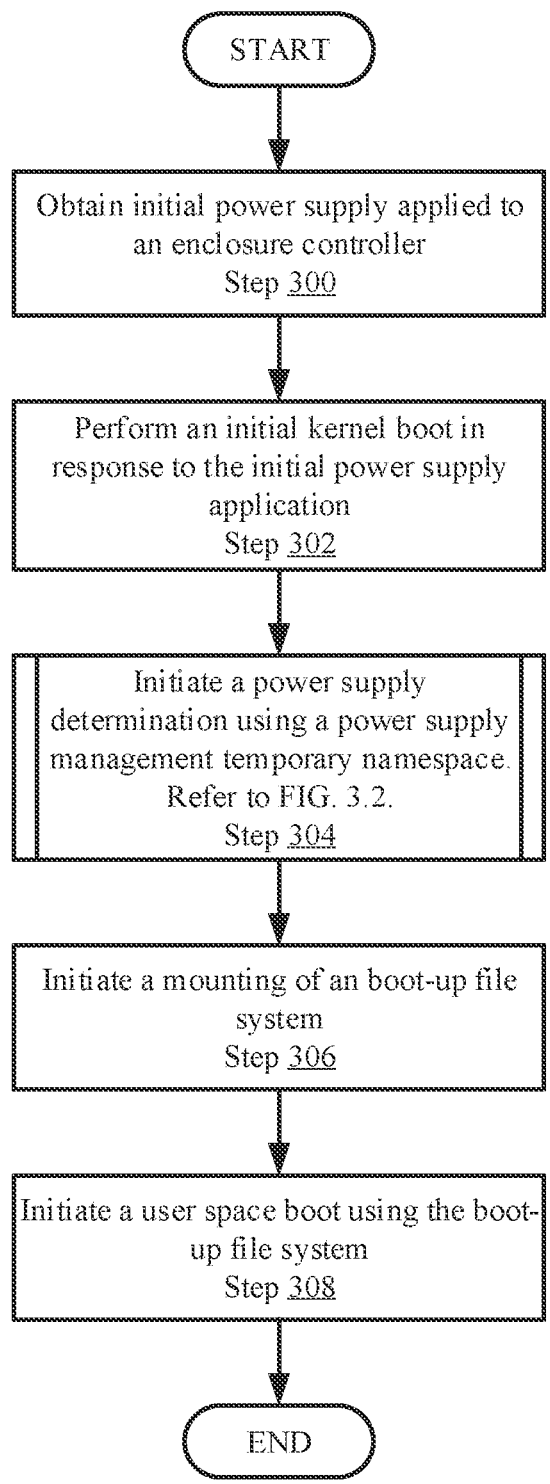
FIG. 3.1

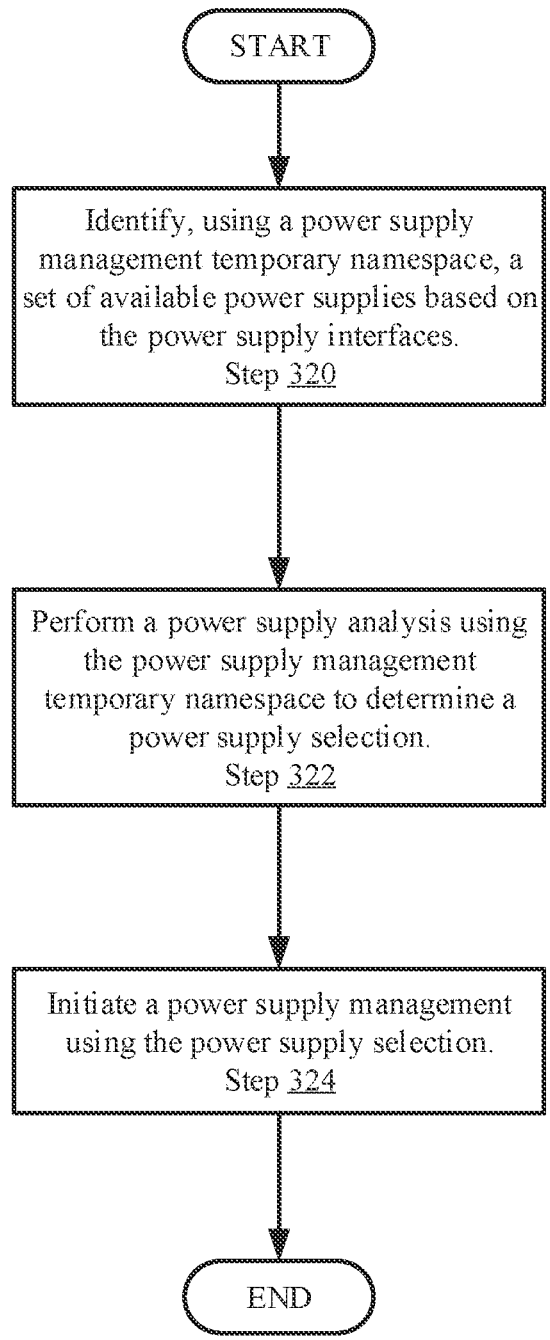
FIG. 3.2

SYSTEM AND METHOD FOR MANAGING A POWER SUPPLY MANAGEMENT NAMESPACE DURING A CHASSIS BOOT UP

BACKGROUND

Information handling systems may include any number of chassis. During boot up, an amount of time may take place between the initial application of power to the chassis and an indication of power up by the chassis. The indication may be via a light emitting device of the chassis.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of an information handling system in accordance with one or more embodiments of the invention.

FIG. 1.2 shows a diagram of a chassis of an information handling system in accordance with one or more embodiments of the invention.

FIG. 3.1 shows a flowchart of a method of managing a boot-up sequence for a chassis of an information handling system in accordance with one or more embodiments of the invention.

FIG. 3.2 shows a flowchart of a method of initiating a power supply determination in accordance with one or more embodiments of the invention.

DETAILED DESCRIPTION

Figure 2:
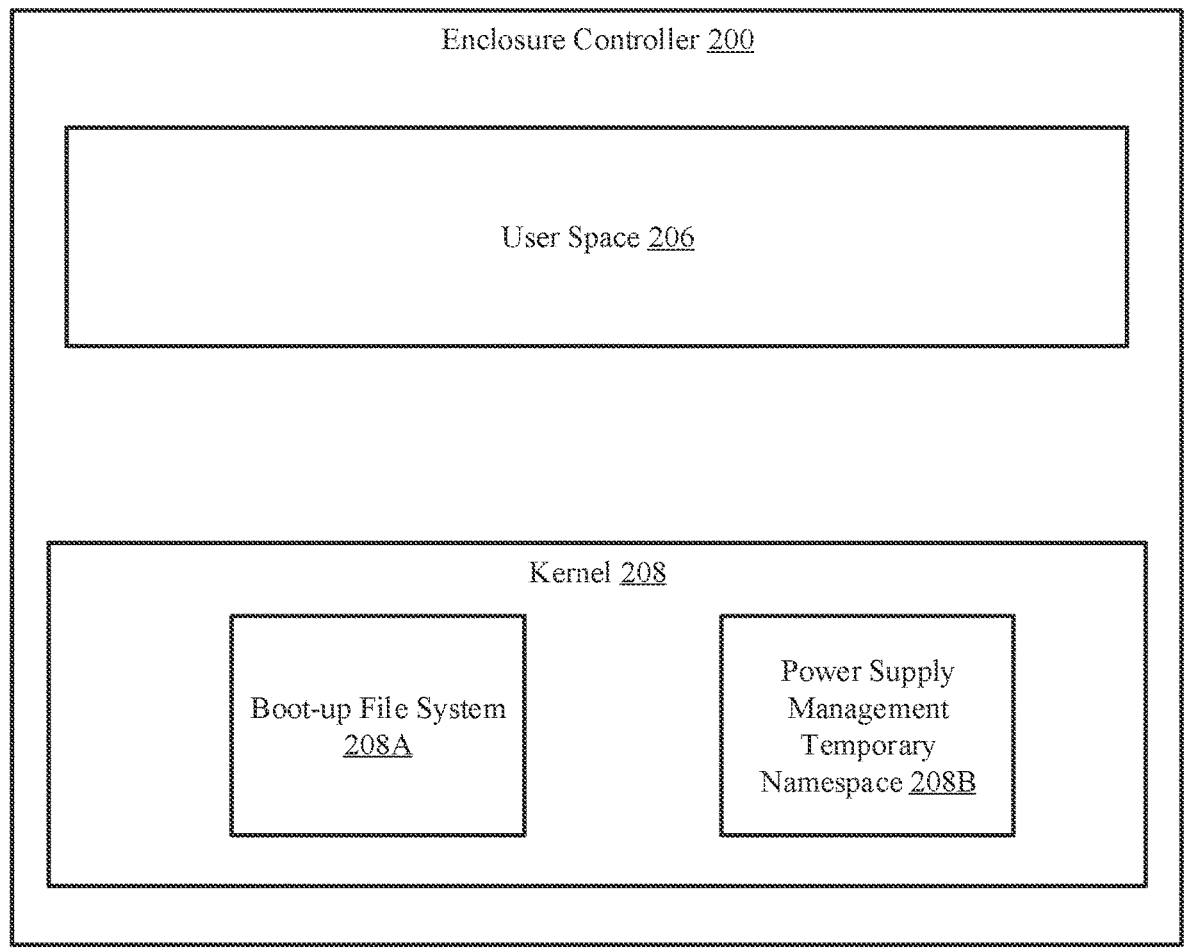
FIG. 2 shows a diagram of an enclosure controller of an information handling system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing components of an information handling system. An information handling system may be a system that provides computer implemented services. These services may include, for example, database services, electronic communication services, data storage services, etc.

To provide these services, the information handling system may include one or more computing devices. The computing devices may include any number of computing components that facilitate providing of the services of the information handling system. The computing components may include, for example, processors, memory modules, circuit cards that interconnect these components, etc.

During initiation of the computing device, when power supply is provided to the chassis, a boot up sequence is initiated. The boot up sequence may be a process for initiating a user space of the chassis via the initiation of a kernel. The initiation of the kernel may be performed by the computing components of the chassis as the computing components receive the power supply. The boot up sequence may include obtaining a boot-up file system that is used by the kernel and/or user space to perform the operation of the chassis during the boot up process. Following the completion of the boot up sequence, an indication is provided by the chassis to an operator (e.g., a person) observing the chassis. The indication may be performed via, for example, a light emitting device that lights up following the performance of the boot up sequence.

To improve the time taken between the boot up process and the indication that the chassis is ready for operation, a power supply management temporary namespace (also referred to as a parallel temporary namespace) is introduced. The parallel temporary namespace may be a method that concurrently performs with the boot up of the kernel and/or user space. By introducing the power supply management temporary namespace, embodiments of the invention enable the boot-up process to include a concurrent initiation of the kernel in addition to the FIG. 1.1 shows an information handling system (10) in accordance with one or more embodiments of the invention. The system may include a frame (110) and any number of chassis (e.g., 100A, 100B, 100C).

The frame (110) may be a mechanical structure that enables chassis to be positioned with respect to one another. For example, the frame (110) may be a rack mount enclosure that enables chassis to be disposed within it. The frame (110) may be implemented as other types of structures adapted to house, position, orient, and/or otherwise physically, mechanically, electrically, and/or thermally manage chassis. By managing the chassis, the frame (110) may enable multiple chassis to be densely packed in space without negatively impacting the operation of the information handling system (10).

A chassis (e.g., 100A) may be a mechanical structure for housing components of an information handling system. For example, a chassis may be implemented as a rack mountable enclosure for housing components of an information handling system. The chassis may be adapted to be disposed within the frame (110) and/or utilize services provided by the frame (110) and/or other devices.

Any one of the chassis (e.g., 100A) may include a light emitting device (112). In one or more embodiments of the invention, the light emitting device (112) emits light in accordance with a status of the chassis (100A). For example, the chassis, during initial application of power by a power supply (not shown) to the chassis, the light emitting device (112) may indicate that the chassis (100A) is in a boot-up state. Additionally, following the completion of the boot-up, the chassis may be in an operational state. In other words, the chassis may have the operating system of the computing device housed in the chassis (100A) be fully operational. If the chassis is in such operational state, the light emitting device (112) may indicate it accordingly.

The indication of the various states of the chassis (100A) by the light emitting device (112) may be used via any combination of light colors, patterns, brightness, or other characteristics of the light emitted by the light emitting device (112) without departing from the invention. For example, an indication of an operational state by the light emitting device (112) may include a green light; in contrast, an indication of the chassis (100A) in the middle of a boot-up sequence may include a red light. As an additional example, an indication that no power is currently applied to the chassis (100A) may include no light emitted by the light emitting device (112).

Any number of components may be disposed in each of the respective chassis (e.g., 100A, 100B, 100C). These components may be portions of computing devices that provide computer implemented services, discussed in greater detail below.

To further clarify the processes of managing the chassis, a diagram of a chassis is provided in FIG. 1.2.

Turning to FIG. 1.2, FIG. 1.2 shows a diagram of a chassis (100A) in accordance with one or more embodiments of the invention. A chassis may be a portion of an IHS and/or house all, or a portion, of an IHS. An information handling system may include a computing device that provides any number of services (e.g., computing implemented services). To provide services, the computing device may utilize computing resources provided by computing components (140). The computing components (140) may include, for example, processors, memory modules, storage devices, special purpose hardware, and/or other types of physical components that contribute to the operation of the computing device. For additional details regarding computing devices, refer to FIG. 5.

In general, embodiments of the invention provide methods, devices, and systems for managing the operation of the chassis (100A). The operation of the chassis may include obtaining power using the power supply interfaces (152) (discussed below), initiating a boot-up of the computing components (140) following the application of power supply to the chassis (100A), and enabling the operation of the chassis (100A) to perform the desired functionality of the chassis (100A) as discussed throughout this application.

To manage the operation of the chassis, the chassis (100A) may include an enclosure controller (150). The enclosure controller (150) may provide the management of the chassis by providing a boot up process that provides the parallel boot up of both: (i) a kernel that hosts an operating system, and (ii) a power supply management process. The kernel may be booted up using a boot-up filename. The power supply management process is a process for determining a main power supply to be provided for the chassis (100A) during the operational state of the chassis (100A).

While illustrated in FIG. 1.2 as a physical structure, as will be discussed with respect to FIG. 2, the enclosure controller (150) may be implemented as a logical entity (e.g., a program executing using the computing components (140)). For example, a computing device disposed in the chassis may host a program that provides the functionality of the enclosure controller (150).

To enable the enclosure controller (150) to provide its functionality, the chassis (100A) may include one or more power supply interfaces (152). The power supply interfaces (152) include functionality for obtaining power from power supplies (not shown) and providing the obtained power to the components of the chassis (100A). The power supply interfaces (152) may include, for example, the circuitry required to enable the power to be supplied to the aforementioned components (e.g., the enclosure controller (150), the computing components (140), and/or the light emitting device (112)) of the chassis (100A). Examples of power supplies obtained by the power supply interfaces (152) include, but are not limited to: alternating current (AC) power supplied from a power plant to a building housing the chassis (100A), a battery operatively connected to the power supply interfaces (152), a fuel cell, a device that converts mechanical motion into electrical power, and a capacitor.

While the chassis (100A) of FIG. 1.2 has been illustrated as including a limited number of specific components, a chassis in accordance with one or more embodiments of the invention may include additional, fewer, and/or different components without departing from the invention. Additionally, while the chassis (100A) is illustrated as having a specific form factor (e.g., rack mount), a chassis in accordance with embodiments of the invention may have different form factors without departing from the invention.

To manage the operation of a chassis, an IHS in accordance with embodiments of the invention may include an enclosure controller. Turning to FIG. 2, FIG. 2 shows a diagram of an enclosure controller (200) in accordance with one or more embodiments of the invention. The enclosure controller (150) illustrated in FIG. 1.2 may be similar to the enclosure controller (200) of FIG. 2.

As discussed above, the enclosure controller (200) may provide management services for initiating the operation of the chassis discussed throughout the application.

In one or more embodiments of the invention, the enclosure controller (200) is implemented using computing devices. The computing devices may be, for example, mobile phones, tablet computers, laptop computers, desktop computers, servers, distributed computing systems, embedded computing devices, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the enclosure controller (200) described through this application and all, or a portion, of the methods illustrated in FIGS. 3.1-3.2. The enclosure controller (200) may be implemented using other types of computing devices without departing from the invention. For additional details regarding computing devices, refer to FIG. 5.

In one or more embodiments of the invention, the enclosure controller (200) is implemented using distributed computing devices. As used herein, a distributed computing device refers to functionality provided by a logical device that utilizes the computing resources of one or more separate and/or distinct computing devices. For example, in one or more embodiments of the invention, the enclosure controller (200) is implemented using distributed devices that include components distributed across any number of separate and/or distinct computing devices. In such a scenario, the functionality of the enclosure controller (200) may be performed by multiple, different computing devices without departing from the invention.

To provide management services, the enclosure controller (200) may include a user space (206), and a kernel (208). The management module (200) may include additional, fewer, and/or different components without departing from the invention. Each of these components is discussed below.

The enclosure controller performs the initiation of the boot-up sequence of the chassis following application of a power supply. The boot-up sequence may be performed in accordance with FIG. 3.1-3.2. When providing its functionality, the enclosure controller may utilize the memory by storing and using previously stored data structures.

In one or more embodiments of the invention, the enclosure controller (200) is implemented using a hardware device including circuitry. The enclosure controller (200) may be implemented using, for example, a digital signal processor, a field programmable gate array, or an application specific integrated circuit. The enclosure controller (200) may be implemented using other types of hardware devices without departing from the invention.

In one or more embodiments of the invention, the enclosure controller (200) is implemented using computing code stored on a persistent storage that when executed by a processor performs all, or a portion, of the functionality of the enclosure controller (200). The processor may be a hardware processor including circuitry such as, for example, a central processing unit or a microcontroller. The processor may be other types of hardware devices for processing digital information without departing from the invention.

In one or more embodiments of the invention, the boot-up sequence, at least in part, includes initiating a boot-up of a kernel (208). The kernel (208) may be used to initiate the user space (206) of the enclosure controller (200). The user space (206) may be an operating system that enables the operation of the computing components of the enclosure controller to be accessed (or otherwise used) by a user (e.g., an administrator) of the enclosure controller (200).

In one or more embodiments of the invention, the kernel (208) is an application that enables the operation of the user space (206). The kernel may serve as an interface between the user space (206) and the hardware components of the chassis. The kernel (208) may provide task management services for the user space (206). The task management services may include managing the memory, the storage devices, the processes performed by the processors, and/or any other hardware components.

To perform the aforementioned functionality, the kernel (208) may include a boot-up file system (208A), a power supply management temporary namespace (208B). The boot-up file system (208A) is a system for managing the modification, storage, and/or otherwise access to data of the chassis. The boot-up file system (208A) may be a temporary application that is utilized specifically during the boot-up process of the chassis. The boot-up file system (208A) may include any number of root file paths that may access data that is utilized during the boot-up process. The data may include, for example, the configuration information used to boot up the user space (206). Other data may be included without departing from the invention.

In addition to the boot-up file system (208A), the kernel (208) may be further utilized to generate a power supply management temporary namespace (208B). In one or more embodiments of the invention, the power supply management temporary namespace (208B) is a data structure that specifies the power supplies provided to the chassis. The power supply management temporary namespace (208B) may further specify additional information about the power supplies that may be used by the enclosure controller (200) to enable the enclosure controller (200) to select a power supply. Such information may include, for example, the alternating current (AC) voltage of the power supply, the available power (e.g., in kilowatt hours (kWh) of the power supply, and the required direct current (DC) voltage to be provided to the computing components of the chassis. Other information may be specified in the power supply management temporary namespace (208B) without departing from the invention.

In one or more embodiments of the invention, the power supply management temporary namespace (208B) utilizes a power supply inventory. In one or more embodiments of the invention, the power supply inventory is a data structure that specifies the available power supplies provided to the chassis. The power supply inventory may be updated as the power supplies are provided and/or otherwise registered by the enclosure controller (200). The power supply inventory may be stored in the kernel (208). Alternatively, the power supply inventory may be stored in persistent storage, in cache of a processor of the enclosure controller (200), or the chassis, and/or any other storage device without departing from the invention.

While the enclosure controller (200) of FIG. 2 has been described and illustrated as including a limited number of specific components for the sake of brevity, an environmental manager in accordance with embodiments of the invention may include additional, fewer, and/or different components than those illustrated in FIG. 2 without departing from the invention.

Returning to FIG. 2, enclosure controller (200) may provide management services. FIGS. 3.1-3.2 illustrate methods that may be performed by the enclosure controller (200) of FIG. 2 when providing environmental management services.

FIG. 3.1 shows a flowchart of a method in accordance with one or more embodiments of the invention. The method depicted in FIG. 3.1 may be used to manage the internal environment of a chassis in accordance with one or more embodiments of the invention. The method shown in FIG. 3.1 may be performed by, for example, an enclosure controller (e.g., 200, FIG. 2). Other components of the system illustrated in FIGS. 1.1-1.2 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

Turning to FIG. 3.1, in step 300, initial power supply is applied to the enclosure controller. The initial power supply application may include an initial plug in of the information handling system to a power supply (e.g., to an AC socket), a connection to a battery, and/or any other initial connection to a power supply. Alternatively, the initial power supply application may include a power-on initiated by a user of the chassis. The power-on may be initiated by pressing a power-on button on the chassis and/or on the information handling system.

In step 302, an initial kernel boot is performed in response to the initial power supply application. The initial kernel boot includes utilizing a bootloader that is installed from storage and/or volatile memory of the enclosure controller. The bootloader loads the required files and/or data required to boot up the kernel. The required files may include, for example, an initial ramdisk. The initial ramdisk may be a process that is initiated during the boot-up process that includes initiating the kernel boot, initiating the mounting of the boot-up file system as discussed below, and initiating the boot-up of the user space using, e.g., the kernel and the boot-up file system.

In step 304, a power supply determination is initiated using a power supply management temporary namespace. In one or more embodiments of the invention, the power supply determination (also referred to as a parallel boot task) includes generating the power supply management temporary namespace, loading such namespace into the kernel, and analyzing the available power supplies based on the power supply management temporary namespace.

In one or more embodiments of the invention, the power supply determination is performed in accordance with FIG. 3.2. The power supply determination may be performed via other methods without departing from the invention.

In step 306, a mounting of a boot-up file system is initiated. In one or more embodiments of the invention, the boot-up file system includes a portion of root paths that enable the kernel to access at least a portion of data in the persistent storage of the enclosure controller that enable completion of the boot-up sequence. The boot-up file system may include a path to access the user space.

In step 308, a user space boot up is initiated using the boot-up file system. In one or more embodiments, the user space is obtained from the persistent storage using the boot-up file system. The user space is loaded to the processor of the enclosure controller.

In one or more embodiments of the invention, steps 306-308 are performed in parallel with step 304. The generation of both the boot-up file system and the power supply management temporary namespace enables the use of the boot-up file system and the use of the power supply management temporary namespace in parallel.

Following the completion of the boot-up sequence, the chassis may be updated to an operational state. A light emitting device of the chassis may indicate the state of the chassis. Additionally, during the boot-up sequence, the light emitting device may indicate the state of the chassis during such sequence.

Using the method illustrated in FIG. 3.1, a system in accordance with embodiments of the invention may enable the use of two data structures in parallel by the enclosure controller to reduce the time taken to perform the boot-up sequence.

FIG. 3.2 shows a flowchart of a method in accordance with one or more embodiments of the invention. The method depicted in FIG. 4.2 may be used to perform a power supply determination in accordance with one or more embodiments of the invention. The method shown in FIG. 3.2 may be performed by, for example, an enclosure controller (e.g., 200, FIG. 2). Other components of the system illustrated in FIGS. 1.1-1.2 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

Turning to FIG. 3.2, in step 320, a set of available power supplies are identified using a power supply management temporary namespace. In one or more embodiments of the invention, the set of available power supplies are identified using a power supply inventory. The power supply inventory may be generated at any point in the boot-up sequence prior to and/or during step 320. The power supply inventory may specify the available power supplies that are provided to the chassis and identified by the enclosure controller. In one or more embodiments of the invention, the power supply management temporary namespace is updated to specify the available set of available power supplies.

In step 322, a power supply analysis is performed using the identified set of power supplies. In one or more embodiments of the invention, the power supply analysis is a process for determining a main power supply to use to provide to the chassis during the operational state of the chassis. The power supply analysis may utilize the power supply management temporary namespace to determine the availability of the power supply. The availability may be determined based on, for example, the amount of power provided by each of the set of the available power supplies. Such information may be provided by the power supply management temporary namespace. Based on the power supply analysis, a power supply selection is determined from the most available power supplies of the available sets of power supplies. Such determination may be made using the power supply management temporary namespace.

In step 324, the power supply selection is used to initiate a power supply management. In one or more embodiments of the invention, the power supply management includes initiating a power on of a power supply interface to manage the access of the power supply to the computing components of the chassis. For example, the power supply interface may be configured, during the power supply management, to perform a conversion of the AC provided by the power supply to a direct current (DC) that may be provided to the computing components. The conversion may be based on the voltage, current, and/or otherwise power requirements of the computing components.

In one or more embodiments of the invention, the power supply management further includes performing a synchronization of the real-time clock (RTC) managed by the user space with an internal timer of the enclosure controller managing the power on of the power supply interface.

Figure 4:
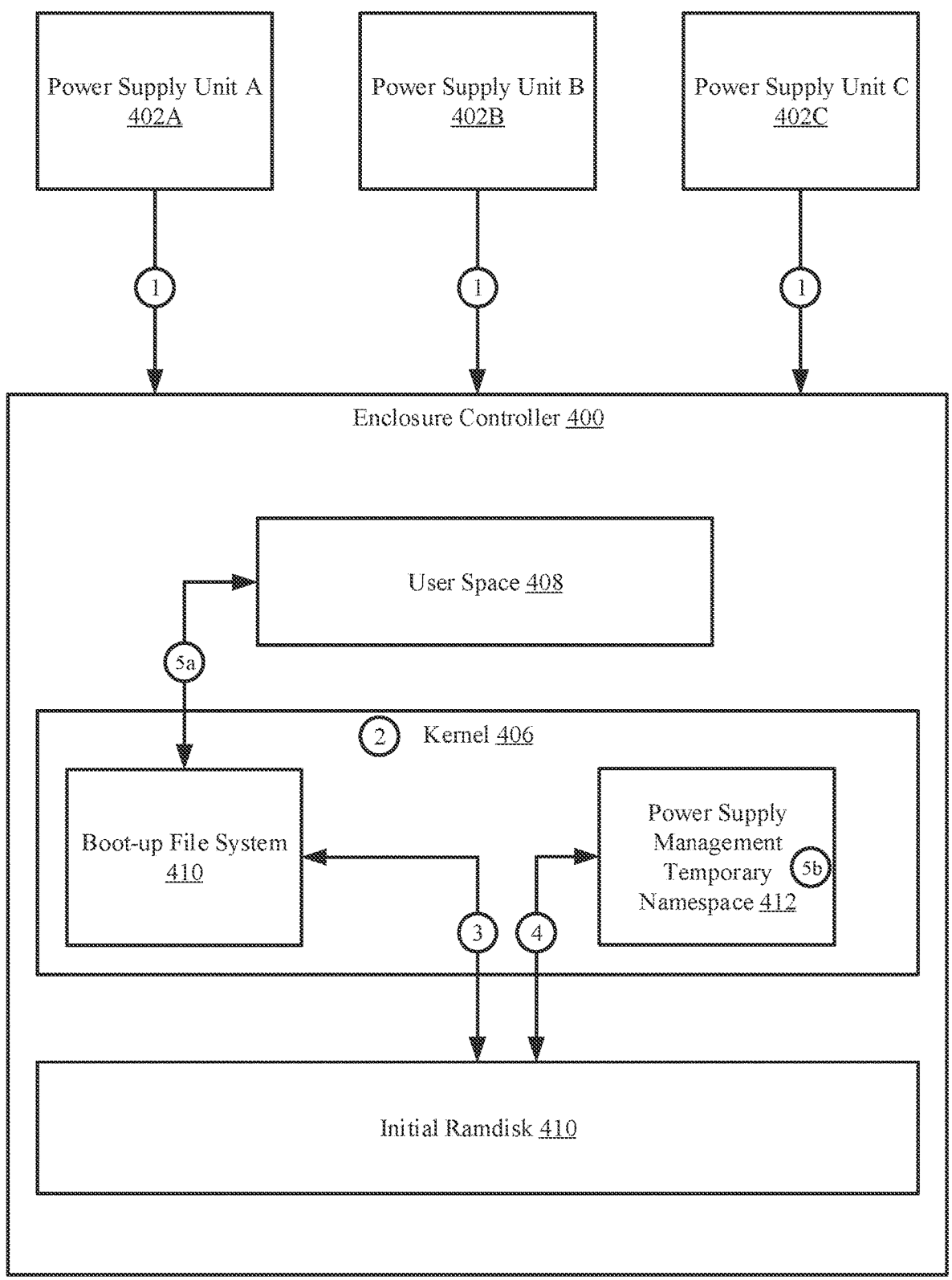
FIG. 4 show an example in accordance with one or more embodiments of the invention.

To further clarify embodiments of the invention, a non-limiting example is provided in FIG. 4. FIG. 4 illustrates a diagram of an example system. For the sake of brevity, only a limited number of components of the system of FIGS. 1.1-1.2 are illustrated in FIG. 4.

EXAMPLE

Consider a scenario as illustrated in FIG. 4 in which an enclosure controller (400) is to be used to boot-up a computing device housed by a chassis that houses a set of computing components.

To provide their functionalities, the enclosure controller (400) may be provided with power via three power supplies (402A, 402B, 402C). Each power supply is providing power to the enclosure controller (400) such that one of the power supplies (e.g., power supply A (402A), power supply B (402B), and power supply C (402C)) may be used as the main power supply [1].

As the power supplies are provided to the enclosure controller (400), the enclosure controller (400) obtains a power-on indication. This may initiate the boot-up sequence for the enclosure controller (400). During such boot-up sequence, a power supply inventory (not shown) is updated with identifiers of the provided power supplies (402A, 402B, 402C). Further, the kernel is booted up in accordance with FIG. 3.1 using an initial ramdisk (410) [2].

Following the initiation of the boot-up sequence, the enclosure controller initiates a mounting of a boot-up file system (410) is performed [3]. The boot-up file system (410) is mounted by initiating operation of the kernel (406) of the enclosure controller (400), and prompting the kernel (406) to perform the mounting. Further, the power supply management temporary namespace (412) is initiated by the initial ramdisk (410) [4].

The kernel (406) initiates boot up of the user space (408). The boot up of the user space (408) includes providing the boot-up file system (410) for the user space (408) to enable access to the data stored in persistent storage (not shown). The boot-up file system (410) may include a portion of the file system to be used during regular operation of the user space (408) [5a]. During the boot-up of the user space (408), a power supply determination is performed in accordance with FIG. 3.2 using the power supply temporary namespace (412) [5b]. The result of the power supply determination is a power supply management that results in powering on power supply unit C (402C) to be used as the main power supply for the enclosure controller (400) and the computing components of the chassis (not shown).

End of Example

Any of the components of FIGS. 1.1-1.2 may be implemented as distributed computing devices. As used herein, a distributed computing device refers to functionality provided by a logical device that utilizes the computing resources of one or more separate and/or distinct computing devices.

Figure 5:
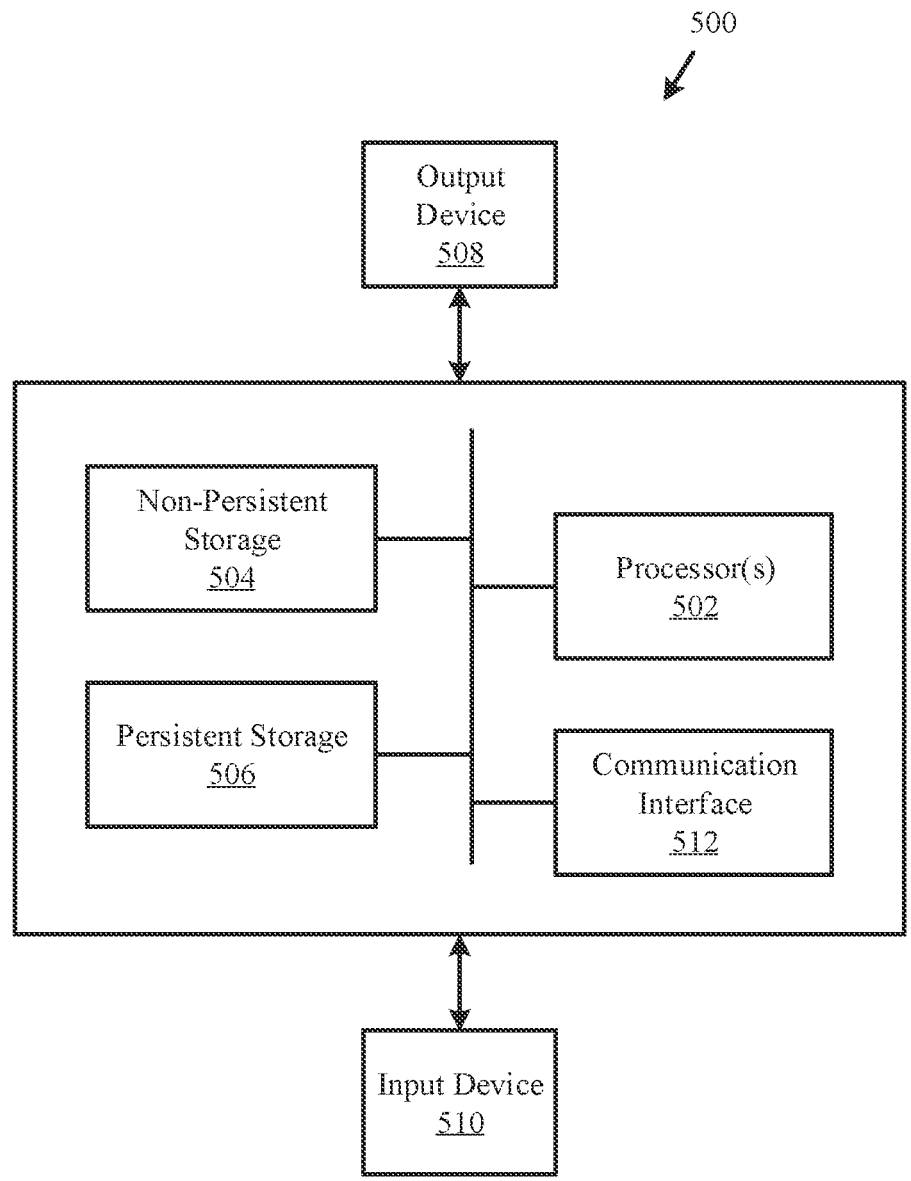
FIG. 5 shows a diagram of a computing device in accordance with one or more embodiments of the invention.

Additionally, as discussed above, embodiments of the invention may be implemented using a computing device. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide an improved method for managing components of an information handling system. Specifically, embodiments of the invention may provide a method and device for managing the operation of the information handling system during a boot up sequence. Embodiments of the invention include providing a power supply management temporary namespace during the boot-up sequence such that the determination of the main power supply is performed in parallel during the initiation of the user space and the use of the boot-up file system. In this manner, the time taken to perform the boot-up sequence is significantly reduced, thus improving the usability of the chassis.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A chassis, comprising:
a power supply interface electrically connected to a plurality of power supplies; and
a processor operating in the enclosure controller,
wherein the enclosure controller is adapted to:
apply power to the enclosure controller using the power supply interface;
initiate a boot-up of a kernel of the chassis in response to the applying power;
initiate a parallel boot task using a parallel temporary namespace to identify a power supply of the plurality of power supplies,
wherein initiating the parallel boot task comprises synchronizing a real-time clock of a user space and an internal timer of the enclosure controller;
initiate a mounting of a boot-up file system; and
initiate a user space boot-up using the boot-up file system, wherein the user space boot-up and the parallel boot task are initiated in parallel.

2. The chassis of claim 1, wherein initiating the parallel boot task comprises:
identifying, using the parallel temporary namespace, the plurality of power supplies;
performing a power supply analysis using the parallel temporary namespace to determine a power supply selection, wherein the power supply selection specifies the power supply; and
initiating the power supply management for the chassis using the power supply selection.

3. The chassis of claim 2, wherein initiating the power supply management comprises powering on the power supply using the power supply selection.

4. The chassis of claim 1, further comprising:
a light emitting device,
wherein the parallel boot task further comprises:
prompting the light emitting device to display a first light pattern.

5. The chassis of claim 4, wherein the enclosure controller is further programmed to:
after completion of the user space boot-up, prompting the light emitting device to display a second light pattern.

6. The chassis of claim 1, wherein apply power to the enclosure controller comprises obtaining the power from a second power supply of the plurality of power supplies.

7. A method for managing a chassis, comprising:
applying, by an enclosure controller of the chassis, a power to the enclosure controller using a power supply interface, wherein the power supply interface is operatively connected to a plurality of power supplies;
initiating a boot-up of a kernel of the chassis in response to the applying power;
initiating a parallel boot task using a parallel temporary namespace to identify a power supply of the plurality of power supplies,
wherein initiating the parallel boot task comprises synchronizing a real-time clock of a user space and an internal timer of the enclosure controller;
initiating a mounting of a boot-up file system; and
initiating a user space boot-up using the boot-up file system, wherein the user space boot-up and the parallel boot task are initiated in parallel.

8. The method of claim 7, wherein initiating the parallel boot task comprises:
identifying, using the parallel temporary namespace, the plurality of power supplies;
performing a power supply analysis using the parallel temporary namespace to determine a power supply selection, wherein the power supply selection specifies the power supply; and
initiating the power supply management for the chassis using the power supply selection.

9. The method of claim 8, wherein initiating the power supply management comprises powering on the power supply using the power supply selection.

10. The method of claim 7, wherein the parallel boot task further comprises:
prompting a light emitting device to display a first light pattern.

11. The method of claim 10, further comprising:
after completion of the user space boot-up, prompting the light emitting device to display a second light pattern.

12. The method of claim 7, wherein applying the power comprises obtaining the power from a second power supply of the plurality of power supplies.

13. A non-transitory computer readable medium comprising computer readable program code, which when executed by a computer processor enables the computer processor to perform a method for managing a chassis of an information handling system, the method comprising:
applying, by an enclosure controller of the chassis, power to the enclosure controller using a power supply interface, wherein the power supply interface is operatively connected to a plurality of power supplies;
initiating a boot-up of a kernel of the chassis in response to the power supply application;
initiating a parallel boot task using a parallel temporary namespace to identify a power supply of the plurality of power supplies,
wherein initiating the parallel boot task comprises synchronizing a real-time clock of a user space and an internal timer of the enclosure controller;
initiating a mounting of a boot-up file system; and
initiating a user space boot-up using the boot-up file system, wherein the user space boot-up and the parallel boot task are initiated in parallel.

14. The non-transitory computer readable medium of claim 13, wherein initiating the parallel boot task comprises:
identifying, using the parallel temporary namespace, the plurality of power supplies;
performing a power supply analysis using the parallel temporary namespace to determine a power supply selection, wherein the power supply selection specifies the power supply; and
initiating the power supply management for the chassis using the power supply selection.

15. The non-transitory computer readable medium of claim 14, wherein initiating the power supply management comprises powering on the power supply using the power supply selection.

16. The non-transitory computer readable medium of claim 13, wherein the parallel boot task comprises:
after initiating the user space boot-up, prompting a light emitting device to display a first light pattern.

17. The non-transitory computer readable medium of claim 13, wherein applying the power comprises obtaining the power from a second power supply of the plurality of power supplies.

* * * * *